United States Patent [19]

Sevenhans et al.

[11] Patent Number: 5,528,637
[45] Date of Patent: Jun. 18, 1996

[54] SYNCHRONIZING CIRCUIT

[75] Inventors: Joannes M. J. Sevenhans, Brasschaat; Hans A. M. Naert, Boekenberglei, both of Belgium

[73] Assignee: Alcatel N.V., Rijswijk, Netherlands

[21] Appl. No.: 320,963

[22] Filed: Oct. 12, 1994

[30] Foreign Application Priority Data

Oct. 12, 1993 [EP] European Pat. Off. ............... 93202867

[51] Int. Cl.[6] .................................................. H04L 7/02
[52] U.S. Cl. .......................... 375/371; 375/355; 375/362; 327/161
[58] Field of Search ................................. 375/354, 355, 375/359, 362, 371, 373; 327/144, 153, 161, 165; 370/105.3, 108

[56] References Cited

U.S. PATENT DOCUMENTS

| | | | |
|---|---|---|---|
| 4,012,598 | 3/1977 | Wiley | 375/371 |
| 4,242,755 | 12/1980 | Gauzan | 375/368 |
| 4,386,323 | 5/1983 | Jansen | 327/161 |
| 4,756,011 | 7/1988 | Cordell | 375/371 |
| 4,780,889 | 10/1988 | Leg et al. | 375/373 |
| 4,841,551 | 6/1989 | Avaneas | 375/371 |
| 4,984,249 | 1/1991 | Long et al. | 375/368 |
| 5,034,967 | 7/1991 | Cox et al. | 375/373 |
| 5,197,086 | 3/1993 | Jackson et al. | 327/144 |

FOREIGN PATENT DOCUMENTS 8805236  7/1988  WIPO .

OTHER PUBLICATIONS

"A 660 Mb/s CMOS Clock Recovery Circuit with Instantaneous Locking for NRZ Data and Burst-Mode Transmission", M. Banu et al, ISSCC '93, *Digest of Technical Papers*, pp. 102–103, IEEE, Feb. 25, 1993.

"Clock Recovery Circuits with Instantaneous Locking", M. Banu et al, *Electronics Letters*, vol. 28, No. 23, Nov. 5, 1992, pp. 2127–2130.

*Primary Examiner*—Young T. Tse
*Attorney, Agent, or Firm*—Ware, Fressola, Van Der Sluys & Adolphson

[57] ABSTRACT

A synchronizing circuit (SC) is proposed which recovers from input data (ID) applied thereto a data clock signal (DC) synchronous therewith in frequency and in phase. The circuit (SC) consists of a tuned tapped delay line (TDL) generating a plurality of mutually delayed local clock signals (DCS), a latching circuit (SM) sampling these delayed local clock signals at input data level transitions thereby providing sampled versions (LCSV) thereof as well as a comparator (C1) pairwise comparing said delayed local clock signals with respective ones of the sampled versions. It can be verified that with such a circuit the level transitions of the appropriate data clock signal (DC) are generated at the outputs of the comparator (C1) when the latter drives its output high only if a sufficient number of its pairwise comparisons hold.

8 Claims, 2 Drawing Sheets

SYNCHRONIZING CIRCUIT

TECHNICAL FIELD

The present invention relates to a synchronizing circuit including a clock phase adjustment means which is triggered by input data level transitions of input data applied thereto to phase adjust a local clock signal and which provides a data clock signal with clock signal level transitions aligned to said input data level transitions.

BACKGROUND OF THE INVENTION

Such a synchronizing circuit is already known in the art from the article "A 660 Mbit/s CMOS clock recovery circuit with instantaneous locking for NRZ data and burst-mode transmission", by M. Banu et al., ISSCC '93, digest of technical papers, pp. 102–103, IEEE.

In this known synchronizing device the clock phase adjustment means comprises two voltage controlled oscillators alternately started and stopped by the level transitions in the input data, as shown in FIG. 1 of the article. In this way the output signals of the oscillators constitute phase shifted versions of the local clock signal, called "External Reference Frequency". This frequency is accurately reproduced in these output signals thanks to the depicted mechanism involving the use of a phase locked loop and a third voltage controlled oscillator matched to the previous two. The OR'ing of the above outputs then verifiably leads to the data clock signal having a correct phase, i.e. having level transitions aligned to those of the input data.

As argued in the article, in high-speed burst-mode applications commonly associated to the emergence of ATM or Asynchronous Transfer Mode technology, such an open-loop approach for recovering the data clock signal is preferable over conventional closed loop circuits, such as phase locked loops, since the latter are characterized by a locking delay and require a high input data level transition density to remain in the locked condition. By using the above open-loop strategy these problems are avoided as recovery of the data clock phase is performed instantaneously at the occurrence of an input data level transition, while the accuracy of the ratio of the local clock signal and input data frequencies ensures that a loss of phase synchronism before occurrence of a new input data level transition is highly unlikely.

However, the known implementation of this open-loop approach has a number of drawbacks particularly with respect to integrated circuit or IC technology. Indeed, the described circuit requires three matched voltage controlled oscillators since otherwise the above accuracy of the generated frequency is not guaranteed. Also, the known synchronizing circuit uses a phase locked loop at very high operating frequencies which is unattractive for stability reasons. But most importantly does the known circuit require a local clock signal having a frequency equal to that of the input data. Indeed, it is very difficult to generate such a local clock frequency accurately and furthermore such a high frequency complicates the circuit since all building blocks need to operate at this frequency.

DISCLOSURE OF INVENTION

An object of the present invention therefore is to provide a synchronizing circuit of the above type but which allows to implement the mentioned open-loop approach in a way more suited to IC-technology and which may operate with local clock signal frequencies which are relatively low compared to the input data frequency.

The above object is achieved thanks to the fact that said clock phase adjustment means includes delay means to derive from said local clock signal a plurality of mutually delayed local clock signals, sampling means to sample each of said delayed local clock signals at said input data level transitions thereby providing sampled versions of said delayed local clock signals and comparison means to compare said delayed local clock signals with respective sampled versions and to generate level transitions of said data clock signal based on outputs of said comparison.

In so doing the open-loop approach is implemented with the same advantages as recited above as each input data level transition again obviously defines a corresponding data clock signal level transition and that afterwards, and in the absence of further input data level transitions, these data clock level transitions periodically reoccur with a correct phase and at the correct frequency. Indeed, the correlation of the delayed clock signals with the sampled values thereof and hence also the data clock signal level transitions occur with the latter correct frequency, defined by the local clock signal as in the known circuit, and at moments defined by the previous input data level transition.

Although in the present case the data clock signal can in the absence of input data level transitions only have a discrete number of phases, namely only those defined by the successive delayed local clock signals, this is no drawback as it is a simple way of trading off circuit complexity with accuracy and as this accuracy need never be absolute. It is indeed not necessary to derive a data clock signal with a phase such that the input data is sampled at a specific point but it always suffices to sample this data in a narrow region dependent upon its eye diagram together with an allowed error rate. It can be verified that for instance in providing only four delayed local clock signals the sampling point is within a region of 90 degrees about the optimal sampling point which suffices for most applications. In general an improvement in phase accuracy is obtained if at least two such delayed clock signals are available since then the uncertainty region is in any case less than 360 degrees, i.e. then a gain with respect to a completely random phase is achieved.

Thanks to its generic nature the above circuit may be very simply adapted to operate at a local clock frequency lower than the frequency with which input data is received as follows from a very important feature of the invention which is that the frequency of said input data is substantially equal to N times the frequency of said local clock signal, with N larger than 1, that said delay means provides at least 2N said delayed clock signals mutually delayed by substantially equal delays of (360 degrees)/(2N–1) referring to the period of said local clock signal, and that said comparison means includes N comparators each Xth (X=1 ... N) one of which compares each said delayed clock signal with a said sampled version of a said delayed clock signal shifted in phase over ((X–1)*360 degrees)/N with respect to the former delayed clock signal, as well as a gating means for logically OR'ing outputs of said comparators and for so providing said data clock signal at its output.

Clearly the delayed clock signals and their sampled values correlate only once during a period of the local clock signal but in the above way the missing pulses of the data clock signal can also be generated since the sampled values also correlate once a period with any phase shifted version of the delayed clock signals. Such a phase shifted version is readily obtained by changing the order in which the delayed clock signal values are compared to the sampled values and by doing this in the above specific way the missing N–1 pulses can be reconstructed at points in a local clock signal period which are evenly spaced. Hence, the thus reconstructed pulses also form together the data clock signal at the desired input data frequency without having to provide a local clock signal at this frequency and without having to operate all circuits included in the synchronizing circuit thereat.

It can be seen that in the above way the complexity of the circuit may be traded off against amount of IC surface it occupies. Indeed, providing local clock signals at lower requires more comparators as well as more delayed local clock signals and hence also more IC surface. Again the obtained accuracy is dependent on the number of delayed clock signals, at least two different phases and correspondingly at least two delayed clock signals having to be provided per data clock pulse, and thus also remains the above mentioned trade-off of complexity against accuracy valid. Furthermore and similarly to what was already mentioned above, it suffices for most applications to provide four delayed clock signals per data clock pulse, i.e. 4N signals in the present case.

Yet further characteristic features of the present invention are that each said comparator comprises 2N Exclusive-OR gates which compare said delayed local clock signals with respective ones of said sampled versions, as well as AND'ing means to produce a level transition in said comparator outputs when the number of high inverted outputs of said Exclusive-OR gates drops below or exceeds a predetermined threshold level and that said delay means derives 6N said delayed clock signals and that said predetermined threshold level is comprised between 2N−2 and 2N−4.

In providing 6N delayed clock signals, correlation of the delayed clock signals with the sampled values persists for 60 degrees, which is also the accuracy of the data clock signal phase. It may be verified that in using the threshold value defined hereinabove the data clock signal pulse extends over three distinct correlation intervals and hence exactly over 180 degrees such that the data clock signal so recovered advantageously has a duty cycle of 50% which may be required for some applications.

A further characteristic feature of the invention is that it also includes filter means comparing previous values of said sampled versions to new values of said sampled versions and only overwriting said previous values with said new values if their difference is smaller than a filtering threshold.

In so doing an elegant way of providing immunity to input data glitches, which may considerably affect the clock recovery process if their occurrence is uncorrelated with the input data level transitions, is provided. Such immunity may not be provided in the known circuit as it updates the clock recovery instantaneouly upon any occurrence of any input data level transistion irrespective of it being a glitch, whereas in the present circuit as described above these glitches may be filtered out if their phase differs more from the previous phase than can be attributed to input data phase wander, i.e. when the new sampled values differ too much from the previous sampled values.

These and other objects, features and advantages of the present invention will become more apparent in light of the detailed description of a best mode embodiment thereof, as illustrated in the accompanying drawing.

BEST MODE FOR CARRYING OUT THE INVENTION

This synchronizing circuit SC is for instance used in an asynchronous passive optical network, e.g. as disclosed in the published European patent application EP-A1-0544975, corresponding to U.S. Ser. No. 07/983,876 now U.S. Pat. No. 5,353,285 and adapted to recover high speed data transmitted thereon in short bursts in either direction. This high speed data, after optical-to-electrical conversion thereof, constitutes input data ID which is applied to SC via a like named terminal and is converted by SC to parallel output data OD, to be stored in an elastic buffer, by using a data clock signal DC which is synchronous with the input data ID and which is derived from a local clock signal LCS, as explained in detail hereinbelow.

The synchronizing circuit SC includes a tuned tapped delay line TDL to which a local clock signal LCS is applied. TDL derives from the clock signal LCS, having a frequency of 155 MHz, 24 successive delayed clock signals DCS mutually delayed over ¹⁄₂₄th of 360 degrees referring to the period of the local clock signal LCS.

These 24 delayed clock signals DCS are applied both to a sampling circuit or means SM which latches the sampled versions of the delayed local clock signals and to first inputs of the 4 comparators C1/4. SM is controlled by the input data ID, which has a bitrate of 622 Mbit/s and is synchronous with a serial transmit clock frequency of 620 MHz, and samples and latches the actual values of the 24 delayed clock signals DCS at the occurrence of input data level transitions. SM further provides on its 24 outputs LCSV like named sampled and latched delayed clock signal values LCSV and applies them to second inputs of the 4 comparators C1/4 whose structure C is depicted in more detail in FIG. 2.

Without already discussing the structure C or the operation of the comparators C1/4 in detail, it is important to note that each comparator C1/4 pairwise compares delayed clock signals DCS with respective ones of the sampled clock signal values LCSV applied to associated first and second inputs thereof respectively. However, C1/4 compare different sets of pairs as the order in which the sampled clock signal values LCSV are applied to the second inputs thereof changes from one comparator to the other, as schematically shown in FIG. 1 and as therefore the pairs of signals applied to the associated first and second inputs of the comparators C1/4 are also different from one comparator to the other.

Figure 1:
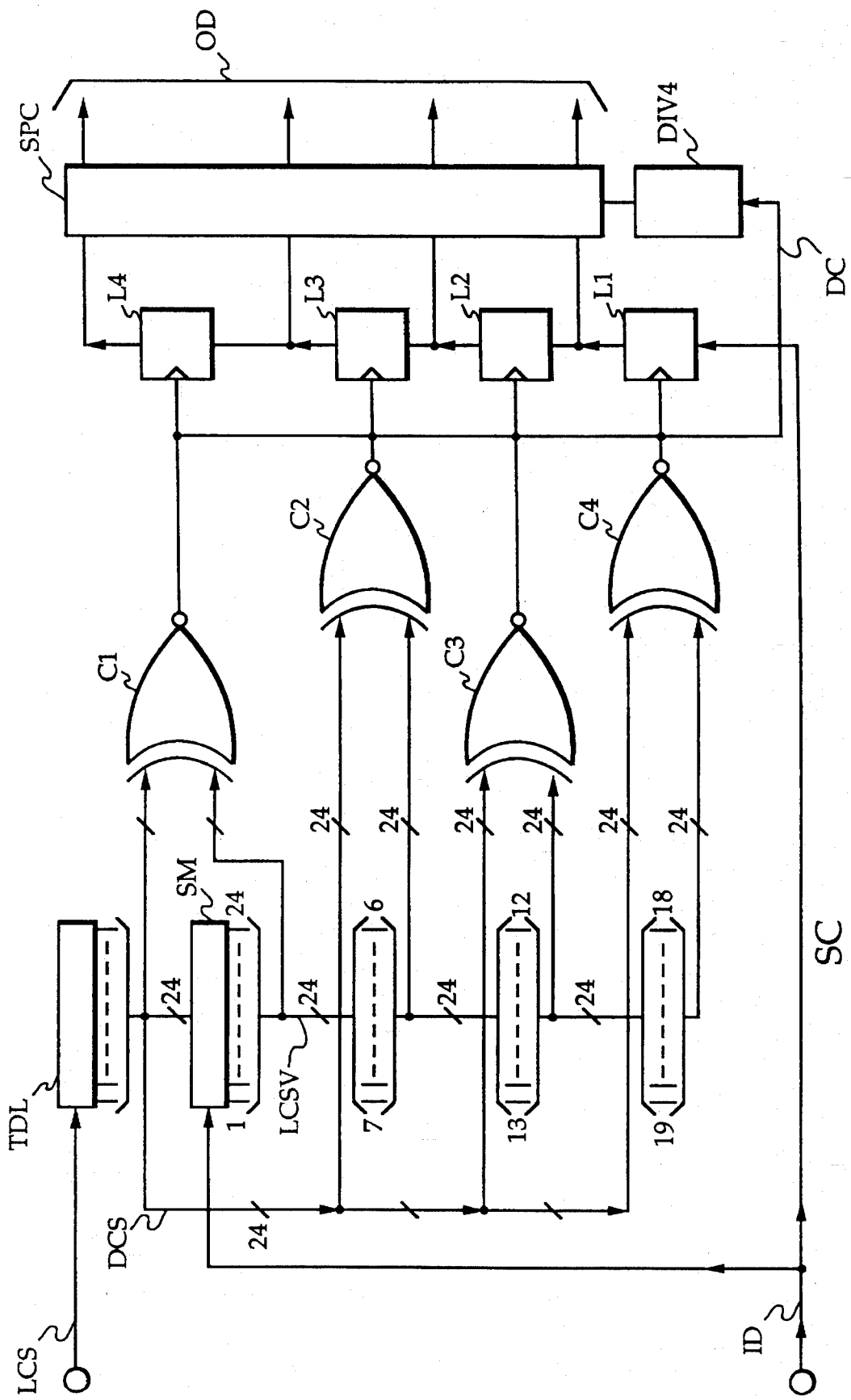
FIG. 1 shows a synchronizing circuit SC according to the present invention; and, FIG. 2 represents a structure C of the comparators C1/4 used in the synchronizing circuit SC of FIG. 1.

The reordering depicted in FIG. 1 more particularly corresponds to a phase shift of ¼th of 360 degrees between two consecutive ones of the comparators C1/4. The comparator C1 so compares the delayed clock signals DCS with respective sampled values LCSV derived by SM from these same signals of DCS whereas the comparators C2, C3 and C4 compare these clock signals DCS with respective sampled values LCSV shifted in phase with those compared by C1 over 90, 180 and 270 degrees respectively. In other words and by indicating the signals DCS and the values LCSV derived therefrom by DCS(1)−(24) and LCSV(1)−(24) respectively, the signals applied to associated first and second outputs of a comparator CN, with N from 1 to 4, may be denoted by DCS(X) and LCSV(Y) where Y is cyclically shifted over 6(N−1) positions to the right when considering positions 1 through 24.

The above comparators C1/4 thus produce 4 distinct output signals which are combined via a wired-OR connection generating the above mentioned data clock signal on the line DC synchronous with input data on the line ID, as demonstrated below in discussing the operation of the synchronizing circuit SC in more detail. The data clock signal DC is used to clock 4 latch circuits L1/4 which are coupled in series so as to constitute a shift register and to the first latch circuit L1 of which the input data ID is applied. By the synchronous data clock signal DC, the input data is thus sampled and shifted in successive ones of the latch circuits L1/4.

The data clock signal DC is further divided by 4 by a divide-by-four circuit DIV which thus provides at its output a 155 MHz clock signal synchronous with the signal on the line DC. The latter clock signal output is connected to a control input of a series-to-parallel conversion circuit SPC to which the outputs of L1/4 are connected. In this way the input data ID latched in L1/4 are converted to the parallel output data OD to be stored in an elastic buffer (not shown) as mentioned before. It is clear that in this way the input data ID is available at the output of this elastic buffer for retrieval under control of a clock signal, e.g. derived from the local clock signal LCS, independent from the input data phase and frequency.

With regard to the operation of SC it will now be demonstrated that the data clock signal DC is indeed a clock signal synchronous in phase and frequency with input data ID such that it may be used to perform the sampling and conversion operations described with reference to L1/4, DIV and SPC.

It is clear that upon the occurrence of each level transition of the input data ID the values of the delayed clock signals DCS and the sampled clock signal values LCSV are equal as a consequence of which the first comparator C1 finds all its pairwise comparisons to hold and hence drives its output signal and the data clock signal DCS high. If thereafter the input data is such that further input data level transitions continue to occur this process is repeated, thus obviously producing the required data clock signal DC.

When on the contrary the level of the input data ID remains unchanged, i.e. has no further transitions, it is also clear that exactly ¼th of a period of the local clock signal later the second comparator C2 finds all its pairwise comparisons to hold and thereby drives its output and hence also the data clock signal high once again. Indeed, after ¼th of a local clock signal period the shift in the values of the delayed clock signals DCS exactly corresponds to the above mentioned reordering of the sampled clock signal values LCSV with respect to C2. It can be easily verified that, in the absence of further input data level transitions, the comparators C1/4 sequentially produce data clock signal pulses mutually shifted over ¼th of a period of the local clock signal LCS. Since the latter clock signal pulses hence have a frequency of 155 MHz corresponding to that of the local clock signal, the resulting data clock signal DC has the required frequency of 620 MHz. Moreover, the thus produced data clock signal DC has a right phase relationship with the input data ID as the mentioned sequential events are started at the occurrence of an input data level transition indicative of the input data phase.

In case, during the course of the above sequential events, a further level transition of the input data ID occurs the above sequential process starts again with a refreshed value for the phase of the data clock signal DC corresponding to the phase of this last level transition. In this way the synchronizing circuit SC is able to track the phase wander and/or drift of the input data by refreshing the clock recovery process at each new level transition, the time interval between successive transitions being such that the intermediate phase wander and/or drift of the input data ID with high probability does not give rise to sampling errors in the latches L1/4.

From the above it can be verified that the present synchronizing circuit SC poses minimal requirements on the input data ID. In fact it only requires a certain input data level transition density in order to ensure that the recovery process is refreshed prior to the emergence of phase errors occurring for reasons described hereinbelow as well as the presence of a level transition at the start of an input data transmission burst, which can for instance be accomplished by leading this burst of with a 010 sequence in its header (not shown). Both these requirements may be less strict than with conventional circuits based on phase locked loops. Indeed, in the latter case the leading sequence has to be longer to provide sufficient time for the circuit to lock on the input data frequency and the transition density has to be higher to provide enough transitions to remain locked.

With respect to the operation of SC it is to be noted that some inaccuracies are inevitable due to its open-loop nature. Indeed, on the one hand the phase synchronism between the input data ID and the data clock signal DCS only persists if the local clock frequency is exactly 4 times smaller than the input data frequency. On the other hands the phase of the data clock signal DCS is only accurate at the occurrence of the input data level transition as in the further sequential events, as can be verified, only one of the discrete phases of the delayed clock signals DCS can be present in the data clock signal DCS.

However, none of the above inaccuracies has a detrimental effect on the operation of SC. Indeed, on the one hand it is possible to generate both the local clock signal LCS and the clock signal used to generate the input data ID with such an accuracy that a loss of the phase synchronism only occurs after a time interval within which it is practically certain that a new input level transition, refreshing the above sequential events in the above mentioned way, has occurred. On the other hand, 620 MHz period, there are provided 6 different phases, corresponding to the 6 delayed clock signals, for the data clock signal DC such that a sampling point accuracy of 60 degrees with respect to the eye diagram of the input data ID is obtained. This is sufficiently accurate for most applications. When more or less accuracy is required, this can be simply achieved by increasing or decreasing the number of delayed clock signals DCS per 620 MHz period respectively.

Finally, with regard to the over-all operation of SC, it has to be noted that the latching circuit SM may be adapted in a not shown way so as to avoid further inaccuracy of SC resulting from the presence of data glitches in the input data ID. These glitches may be detrimental to the operation of SC since their phase stands in an arbitrary relation to the phase of the input data ID and they thus constitute level transitions of the input data ID giving rise to data clock signal pulses out of phase with respect to the input data ID. It is clear that if the data glitches for some reason occur with the correct input data phase, no harm is done.

The latter inaccuracies may be avoided by using, instead of a single 24 bit array of latches for the latching circuit SM, 2 such arrays connected in series and controlled by associated control circuitry. With such a latching circuit SM newly sampled clock signal values can be stored in the first array whereas the previous sampled clock signal values are forwarded and stored in the second array. The control circuitry can then detect if the last input data level transition was due to an above defined harmful glitch, i.e. a glitch having an incorrect phase with respect to the input data ID, by comparing the new and the previous sampled values LCSV since these harmful glitches give rise to a difference therebetween which is larger than could be the result of the effects of phase wander and drift within the input data ID.

When the latching circuit SM so detects a harmful glitch, it forwards the mentioned previous sampled values via the outputs LCSV to the comparators C1/4 and further controls the arrays of latches in such a way that upon occurrence of a next input data level transition the above mentioned new latched values are overwritten while the mentioned previous values remain stored in the second array. Otherwise, SM just forwards the mentioned new sampled values via LCSV and also overwrites the mentioned previous sampled values with the new sampled values upon occurrence of the next transition.

Figure 2:
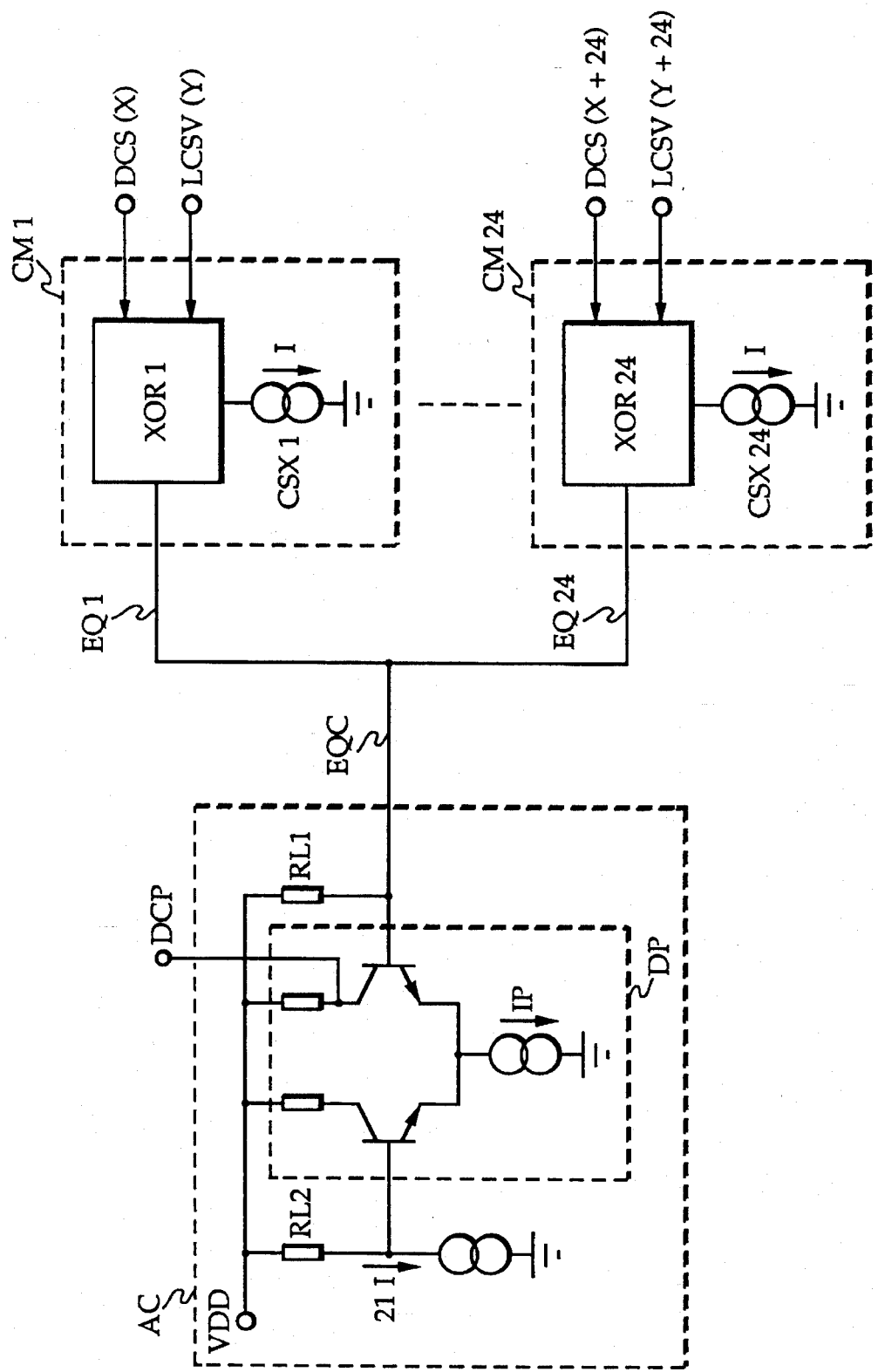

From FIG. 2 it can be seen that the structure C of each of the comparators C1/4 consists of an AND'ing circuit AC and 24 like comparator modules CM1–24. Each of the latter modules CM1–24 has a first and a second input to which a respective one of the delayed clock signals DCS and a respective one of the sampled values LCSV are applied. The delayed clock signals DCS(X) through DCS(X+24) occur on respective like named first inputs of the modules CM1–24 respectively whereas the sampled clock signal values LCSV(Y) through LCSV(Y+24) are applied to the respective like named second inputs of these modules CM1–24 respectively. It is to be noted that the sequences indicated by DCS(X) and LCSV(Y) correspond to the above mentioned mutually related orders of DCS and LCSV of one of the comparators C1/4.

These first and second inputs of the modules CM1–24 are connected to EXOR gates XOR1–24 respectively included in these modules and e.g. comprising a conventional upper part of a Gilbert cell commonly used as EXOR gate. The lower parts of these Gilbert cells XOR1–24 are depicted explicitly and are constituted by current sources CSX1–24 respectively each drawing a predetermined equal current I from the mentioned upper part. As is well known in the art, XOR1–24 can draw this current I from a different terminal depending upon the signal values occurring on their respective first and second inputs. In the present case only one terminal is shown for every EXOR gate XOR1–24, i.e. terminals EQ1–24 respectively via which the respective current I is drawn in the case the mentioned signal values are equal. This means that EQ1–24 represent the inverted EXOR output or the NEXOR output of the Gilbert cells included in XOR1–24. These terminals EQ1–24 are also connected to a common terminal EQC via which a current is drawn which is the sum of the current drawn via EQ1–24, i.e. the current drawn via EQC depends on the number of pairs of signal values in which the constituent values are equal.

On the other hand the AND'ing circuit AC consists of a conventional differential pair DP connected between the schematically depicted ground terminal and a supply voltage terminal $V_{DD}$. A first input of this differential pair DP is connected to the terminal EQC and via a first load resistor RL1 also to the terminal $V_{DD}$ whereas its second terminal is connected to the ground terminal via a current source drawing a current 21 I and to the supply voltage terminal $V_{DD}$ via a second load resistor RL2 having an equal resistance value as RL1. The output of the AND'ing circuit AC is constituted by a data clock pulse terminal DCP on which a like named data clock pulse is generated and this terminal is connected to the collector electrode of a transistor which base electrode constitutes the above first input.

From FIG. 2 it is unambiguously clear that a pulse DCP is generated at the output terminal of AC when the total current drawn by the EXOR gates XOR1–24 via EQC exceeds the current drawn by the current source connected to the second input of the differential pair DP, i.e. when this current is larger than 21 I. Indeed, in this case the current IP drawn by the common current source of the differential pair DP flows via the branch of DP associated to the second input such that the voltage at the terminal DCP is forced to rise to a value equal to the supply voltage at terminal $V_{DD}$, thus giving rise to a data clock signal pulse since the latter terminal DCP is connected to the above mentioned wired or connection between the outputs of the comparators C1/4. This pulse DCP lasts until the current drawn via EQC drops below 21 I in which case the current IP flows to the branch associated to the first input forcing the voltage at DCP to its low value.

It can be easily verified that in using the above structure C for the comparators C1/4 and making the wired or connection with their terminals DCP the data clock signal DC is high when in one of the comparators C1/4 more than a threshold value of 21 of the comparisons made by XOR1–24 hold and it is low in all other cases. Since, as may be easily verified, only an even number of comparisons may hold at the same time in the comparators C1/4, the data clock pulses DCP begin and end when 22 of the comparisons made by XOR1–24 hold and therefore extend over exactly 180 degrees with respect to the input data frequency. Indeed, each time a specific number of comparisons hold this situtation lasts for 60 degrees with respect to the latter frequency and with the above threshold value 3 such comparisons, i.e. 22, 24 and 22 all lead to DCP.

It may thus be appreciated that in the above way a data clock signal DC is generated by SC with a duty cycle of exactly 50% which may be advantageous in some applications. Also by providing a data clock pulse whenever one of three situations with respect to the comparisons made by XOR1–24 occurs, the circuit SC is made more robust since the chance of missing a correlation situation does not automatically lead to a complete miss of the data clock pulse, the phases associated with correlations of 22 of the signals DCS and values LCSV providing sufficient accuracy in the cases where a full correlation of 24 is missed.

It is finally to be noted with respect to SC that the tuned tapped delay line TDL may be constructed according to known principles for instance disclosed in the published European patent application EP-A1-0520127, while bearing in mind that the total delay generated by TDL must be controlled to equal 360 degrees. However, the latter control need not necessarily be very accurate as deviations only give-.rise to small shifts in the sampling points defined by the data clock signal DC which may be allowed depending upon the application in which SC is used and which may in any case be neutralized by providing more taps.

While the principles of the invention have been described above in connection with specific apparatus, it is to be clearly understood that this description is made only by way of example and not as a limitation on the scope of the invention.

We claim:

1. Synchronizing circuit to which a local clock signal having a local clock frequency and period and input data having an input data frequency are applied, and which includes a clock phase adjustment means which is triggered by input data level transitions of said input data and which provides a data clock signal with clock signal level transitions aligned to said input data level transitions, wherein said clock phase adjustment means including delay means to derive from said local clock signal a plurality of mutually delayed local clock signals, sampling means to sample each of said delayed local clock signals at said input data level transitions thereby providing sampled versions of said delayed local clock signals, and a plurality M of comparison means for comparing said delayed local clock signals with respective sampled versions and for generating level transitions of said data clock signal based on outputs of said comparing, is characterized in that the input data frequency is substantially equal to M times the local clock frequency, that said delay means is for providing at least 2N of said delayed clock signals mutually delayed by substantially equal delays of 360 degrees divided by 2N referring to the period of said local clock signal, that said comparison means includes M comparators. each Xth, with X equal to 1 to M, one of which is for comparing each of said delayed clock signals with a corresponding sampled version of said sampled versions of said delayed clock signal shifted in phase over 360 degrees times the quantity X minus 1 and divided by M with respect to the former delayed clock signal, as well as a gating means for logically OR'ing outputs of said comparators for providing said data clock signal, and that N is a whole number multiple of M.

2. Synchronizing circuit according to claim 1 characterized in that said delay means derives at least four said delayed clock signals from said local clock signal.

3. Synchronizing circuit according to claim 1, characterized in that said delay means derives at least 4N of said delayed clock signals from said local clock signal.

4. Synchronizing circuit according to claim 1, characterized in that each said comparator comprises 2N Exclusive-OR gates which compare said delayed local clock signals with respective ones of said sampled versions, as well as AND'ing means to produce a level transition in the output of said comparator when the number of high inverted outputs of said Exclusive-OR gates drops below or exceeds a predetermined threshold level.

5. Synchronizing circuit according to claim 4, characterized in that said delay means derives 6N said delayed clock signals and that said predetermined threshold level is comprised between 2N–4 and 2N–2.

6. Synchronizing circuit according to claim 4, characterized in that said AND'ing means is constituted by a differential pair in which the sum of the output currents of said Exclusive-OR gates is compared to a reference current to which said threshold level corresponds.

7. Synchronizing circuit according to claim 1, characterized in that said delay means is constituted by a tuned tapped delay line controlled in such a way that the delay between said local clock signal and its last tap substantially equal 360 degrees and having evenly spaced taps therebetween.

8. Synchronizing circuit according to claim 1, characterized in that said synchronizing circuit further includes M shift register means for latching and shifting said input data under control of said data clock signal, clock division means for dividing said data clock signal by a number M of locations in said shift register means, and serial-to-parallel conversion means for applying the contents of said shift register means on its output lines under the control of said divided data clock signal.

* * * * *

UNITED STATES PATENT AND TRADEMARK OFFICE
CERTIFICATE OF CORRECTION

PATENT NO. : 5,528,637
DATED : June 18, 1996
INVENTOR(S) : Sevenhans et al

It is certified that error appears in the above-indentified patent and that said Letters Patent is hereby corrected as shown below:

At column 9, line 14, after "comparators", please change the "." to --,--.

Signed and Sealed this

Third Day of December, 1996

Attest:

BRUCE LEHMAN

*Attesting Officer*    *Commissioner of Patents and Trademarks*